United States Patent
Lloyd

[11] Patent Number: 6,164,786
[45] Date of Patent: *Dec. 26, 2000

[54] ELECTROMAGNETIC RAFIATION CONCENTRATOR SYSTEM

[76] Inventor: Beverly Lloyd, 8 Cove Rd., Lake Hopatcong, N.J. 07849

[*] Notice: This patent issued on a continued prosecution application filed under 37 CFR 1.53(d), and is subject to the twenty year patent term provisions of 35 U.S.C. 154(a)(2).

[21] Appl. No.: 09/160,998

[22] Filed: Sep. 25, 1998

[51] Int. Cl.⁷ .................................................. G02B 5/08
[52] U.S. Cl. ...................... 359/851; 359/853; 359/641; 126/685; 126/688; 126/698
[58] Field of Search .................... 359/851, 853, 359/627, 641; 126/684, 689, 690, 691, 692, 693, 694, 695, 685, 688, 698

[56] References Cited

U.S. PATENT DOCUMENTS

| | | | |
|---|---|---|---|
| 4,021,267 | 5/1977 | Dettling | 136/89 PC |
| 4,281,640 | 8/1981 | Wells | 126/438 |
| 4,394,780 | 7/1983 | Mooradian | 455/618 |
| 5,138,490 | 8/1992 | Hohberg et al. | 359/570 |
| 5,214,540 | 5/1993 | Yakimovsky | 359/858 |
| 5,220,462 | 6/1993 | Feldman, Jr. | 359/855 |
| 5,237,170 | 8/1993 | Shatz | 250/216 |
| 5,331,470 | 7/1994 | Cook | 359/859 |
| 5,427,628 | 6/1995 | Hartley | 136/246 |
| 5,613,768 | 3/1997 | Kim | 362/298 |
| 5,631,770 | 5/1997 | Jarmuz | 359/351 |
| 5,640,283 | 6/1997 | Warren | 359/859 |
| 5,684,611 | 11/1997 | Rakuljic et al. | 359/7 |

*Primary Examiner*—Cassandra Spyrou
*Assistant Examiner*—Euncha Cherry
*Attorney, Agent, or Firm*—Thomas L. Adams, Esq.

[57] ABSTRACT

An array of concentrators of electromagnetic radiation (i.e., visible light, radio waves, etc.) employing one or more concentrating devices. Each concentrating device includes: a concentrator system for concentrating the incident electromagnetic radiation impinging thereon; a collimator system disposed in the path of electromagnetic radiation from the concentrator system for producing a beam of electromagnetic radiation; and a redirecting system. Each concentrating device has one or more of its elements staggered such that the beams from the array of concentrating devices result in a stacked or bundled plurality of beams. This bundle of beams is then concentrated again, recollimated and redirected to join with other similarly concentrated beams. This arraying can be repeated again and again, producing stronger and stronger beams or electromagnetic radiation, if desired.

7 Claims, 4 Drawing Sheets

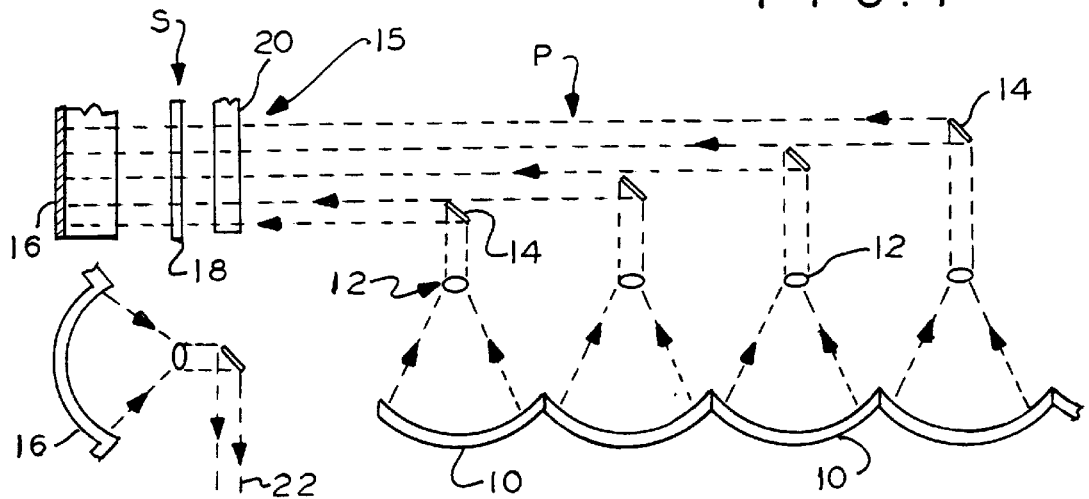
FIG. 1
FIG. 2
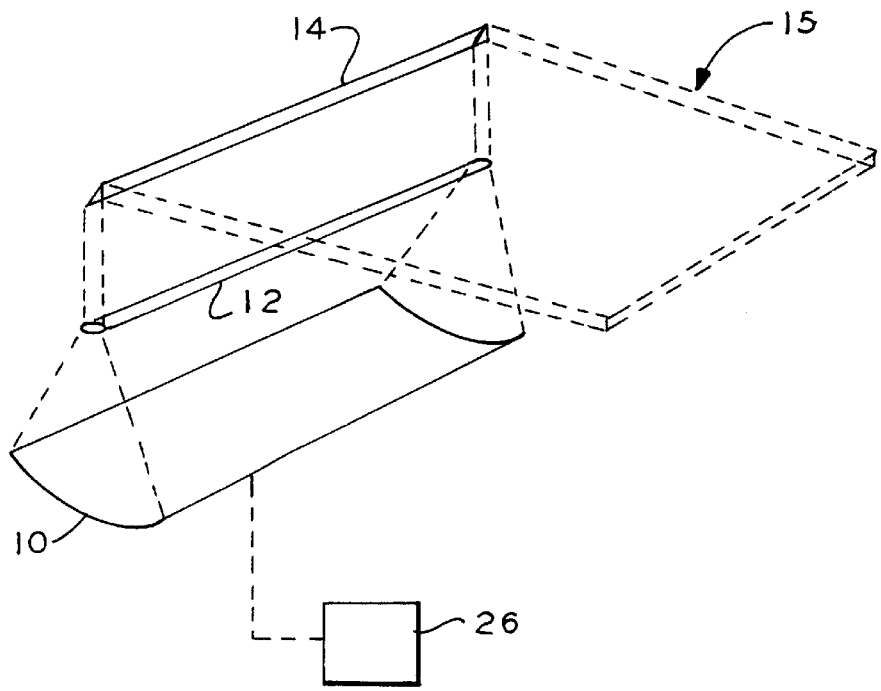
FIG. 3

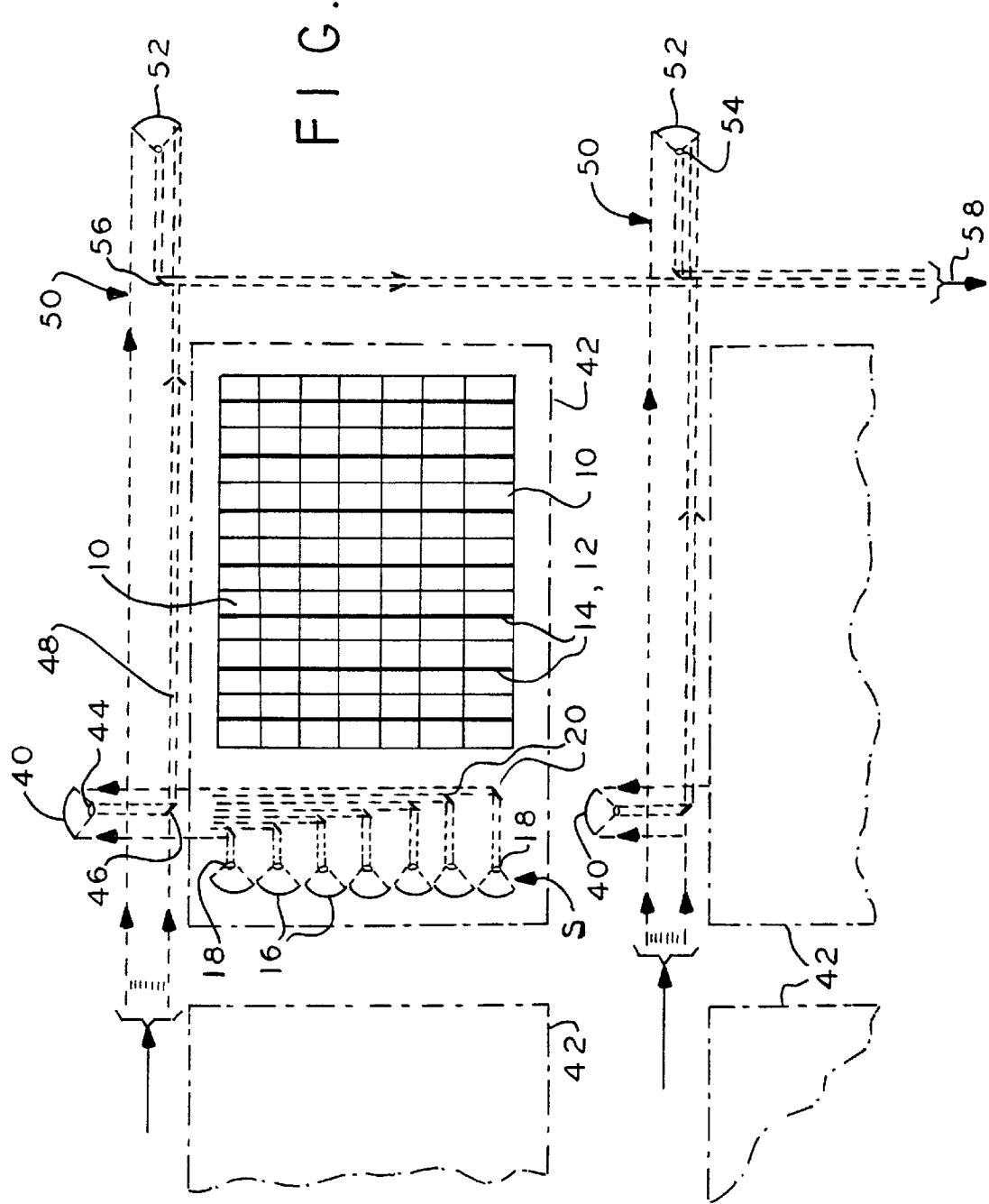

ELECTROMAGNETIC RAFIATION CONCENTRATOR SYSTEM

BACKGROUND OF THE INVENTION

1. Field of the Invention

The present invention relates to electromagnetic radiation concentrators for collecting electromagnetic radiation, and in particular, to a concentrator employing a plurality of concentrating means.

2. Description of Related Art

Various large electromagnetic radiation concentrators have been developed for use either as a solar energy collector, a solar furnace, a telescope and a radio telescope. Solar energy can be used for incineration, high heat applications and experiments and power production. Also, various electromagnetic radiation concentrators can be used for studying or listening for distant objects for celestial exploration.

A common solar energy collector employs a trough-like reflector with a parabolic or spherical profile. A pipe carrying a medium such as oil can be placed at the focus of the reflector. The temperatures that can be produced by this arrangement are limited. Theoretically, the size of the reflector can be increased indefinitely, but such an arrangement tends to have impractically tall walls and is very difficult to build with adequate accuracy.

An alternate solar collector employs a field of mirrors that can be adjusted to reflect sunlight onto an elevated receiver containing a medium such as molten salt, which is heated and used to produce power. These mirrors are flat reflectors. With the mirrors properly aimed, a high energy flux can be concentrated at a small region to raise the medium to very high temperatures. Basic geometric considerations limit the size of the field of mirrors. As more mirrors are added to the field, either the receiver or the mirrors must be successively raised in order to have a clear view for all mirrors. Otherwise, the farther back rows of mirrors would reflect sunlight onto the backs of the farther front rows of mirrors. In addition, the light being reflected onto the receiver becomes more and more distorted due to the angles between the mirrors and receiver becoming steeper. The light shining on the receiver becomes inefficiently spread over a relatively large surface area, similar to how the light from a flashlight that shines on a wall becomes elongated and distorted when you shine that flashlight at an angle to that wall.

Another electromagnetic radiation concentrator involves making a very large parabolic dish reflector. They either use one large solid concentrator or several small concentrators arranged next to one another to resemble one large concentrator. The dish reflector is constructed of whatever material is needed to reflect and concentrate the type of electromagnetic radiation desired. Like the trough reflectors, the size of the reflector can, theoretically, be increased indefinitely. However, the reflector becomes increasingly difficult to build, not to mention the difficulties in supporting and directing such a large structure to follow, e.g., the sun's movement across the sky.

In addition to the size limitations of the above systems, the amount of electromagnetic radiation concentration and the area over which it is concentrated is not adjustable. It remains fixed, once the system is built. Further, the concentrations produced are not in the form of a parallel beam. Such a beam would allow many additional uses including but not limited to: cutting and boring, space and other vehicle propulsion, and laser weaponry.

U.S. Pat. No 4,021,267 shows an apparatus for powering an array of photovoltaic cells. The light from a concentrating reflector is collimated via use of either a lens or a collimating mirror, (similar to a Cassegrain telescope) which then is sent through a prism in order to separate the light into a spectrum. The spectrum then falls on the array of photovoltaic cells. This device does not provide for any means of scaling up the system to gather light from a large area.

U.S. Pat. No. 5,613,768 shows an apparatus for generating parallel light. This arrangement employs a parabolic mirror that is shown in FIG. 5 shining onto an array of mirrors that, in turn, focus light onto a number of apertures that screen the light before it is reflected it again with another array of mirrors. This arrangement is primarily concerned with screening unwanted light from a lamp. It cannot concentrate incoming electromagnetic radiation into a beam.

U.S. Pat. No. 5,220,462 shows a diode glazing, designed to favor the passage of light in only one direction. This device has a series of parallel, semi-cylindrical surfaces that concentrate light through gaps in an array of mirrors. This reference does not discuss combining the light passing through these gaps into a compact beam.

U.S. Pat. No. 5,138,490 shows a grating and mirror for tailoring the intensity profile in a laser beam. The mirror has a convoluted surface, which is designed to reflect a divergent beam, and is therefore not designed as a light concentrator.

U.S. Pat. No. 5,237,170 shows a single reflector, but this disclosure does not reveal any means for scaling up the system to gather light from a large area.

See also U.S. Pat. Nos. 5,214,540; 5,331,470; 5,427,628; 5,631,770; 5,640,283; and 5,684,611.

Accordingly, there is a need for a practical and efficient electromagnetic radiation concentrator that can gather electromagnetic radiation over a relatively large area without size limitations and also produce a concentrated adjustable directed energy beam.

SUMMARY OF THE INVENTION

In accordance with the illustrative embodiments demonstrating features and advantages of the present invention, there is provided an array of concentrators of electromagnetic radiation (i.e., visible light, radio waves, etc.) employing one or more concentrating devices. Each concentrating device includes: a concentrator means for concentrating the incident electromagnetic radiation impinging thereon; a collimator means disposed in the path of electromagnetic radiation from said concentrator means for producing a beam of electromagnetic radiation; and a redirecting means disposed in the path of electromagnetic radiation from said collimator means.

Each concentrating device preferably has one or more of its elements staggered such that the beams from the array of concentrating devices result in a stacked or bundled plurality of beams. This bundle of beams is then concentrated again, recollimated and redirected to join with other similarly concentrated beams. This arraying can be repeated again and again, producing stronger and stronger beams of electromagnetic radiation, if desired.

By employing apparatus of the foregoing type, an improved electromagnetic radiation concentrator is achieved. In one embodiment, an array of reflectors are arranged in rows to gather electromagnetic radiation. These reflectors may be trough-like mirrors having parabolic profiles. An elongated lens can be placed above each reflector to collimate the reflected electromagnetic radiation which then lands on a redirecting reflector. The resulting beam is sheet-like and can be bundled with similar beams to produce a compact beam of electromagnetic radiation having a high energy flux.

An alternate reflector can still be trough-like, but will include a longitudinal slot. Electromagnetic radiation reflected from this reflector can be collimated by another reflector that is also trough-like, but will reflect a collimated beam back through the longitudinal slot in the first reflector. As before, a collimated beam can be reflected and bundled with similar electromagnetic radiation beams to produce a high-energy flux.

Still other systems may use parabolic dishes that focus electromagnetic radiation onto a collimating lens, to produce a beam that can then be bundled with similar beams to produce a high-energy flux. That lens can be replaced with a reflecting dish that transmits collimated electromagnetic radiation back through an aperture in the first reflector. As before, the beam thus produced can be bundled with similar electromagnetic radiation beams to produce a high-energy flux.

An advantage with designs of this type is the ability to expand the system by working in parallel with similar systems. For example, systems of the foregoing type can be arranged in columns that cover a predetermined area, such as a square region. Concentrated beams produced by each column can then be projected with similar electromagnetic radiation beams to another concentrating means. This secondary concentrating means can be of the same type. For example, this next stage of concentration can include a number of reflectors focused onto lenses or reflectors to produce collimated beams that are then bundled using mirrors or the like to form a compact, secondary beam. This entire system can be combined with similar systems which then produce a plurality of secondary beams that can then be combined by a tertiary system, and so forth. These systems can be added to one another over and over again, creating a progressively stronger and stronger final beam.

BRIEF DESCRIPTION OF THE DRAWINGS

The above brief description as well as other objects, features and advantages of the present invention will be more fully appreciated by reference to the following detailed description of some possible illustrative embodiments in accordance with the present invention when taken in conjunction with the accompanying drawings, wherein:

FIG. 1 is an elevational view, partly in section, of an electromagnetic radiation concentrator in accordance with the principles of the present invention;

FIG. 2 is a plan view of the secondary reflector and secondary combining means of FIG. 1;

FIG. 3 is an axonometric view of the one of the primary reflectors and one portion of the primary combining means of FIG. 1, showing the path of a primary beam;

FIG. 6 is a plan view of a plurality of the electromagnetic radiation concentrators of FIG. 1 combined with a secondary, tertiary and quaternary concentrating means;

DETAILED DESCRIPTION OF THE PREFERRED EMBODIMENTS

Referring to FIGS. 1–4, an array of electromagnetic radiation concentrators is shown therein as a primary concentrating means P including a number of primary reflectors 10 (also referred to as a concentrator means 10). Reflectors 10 are in this embodiment, a number of trough-like reflectors that are arranged side-by-side. They may also be arranged in other ways, including non-adjacently. Preferably, the profile of each of the reflectors 10 is parabolic, although other profiles may be used depending upon the desired accuracy, chromatic correction, etc. Reflectors 10 may be formed of a continuous extrusion, but in preferred embodiments the reflectors 10 will be formed from a number of modules having a square outline. These modules may be aligned end to end to form the trough illustrated. Reflectors 10 may be formed of polished sheet metal or glass. In still other embodiments, reflectors 10 may be formed of ceramics, plastics or other materials, in order to best reflect the particular electromagnetic radiation (i.e., light, radio waves, etc.) that needs to be concentrated.

A primary combining means is shown herein as a series of sections, each associated with one of the primary reflectors 10. In this embodiment, the primary combining means includes a number of collimator means 12, shown herein as elongated rods. Each of the elements 12 have a convex, lenticular cross-section. Elements 12 are preferably formed from transparent glass having a refractive index suitable for a collimating lens, although other materials are contemplated. Elements 12 are located above the reflectors 10 and have a shape designed to transform the converging electromagnetic radiation reflected from the reflectors 10 into a parallel or collimated sheet of electromagnetic radiation (also referred to as a stacked or bundled plurality of beams).

Figure 4:
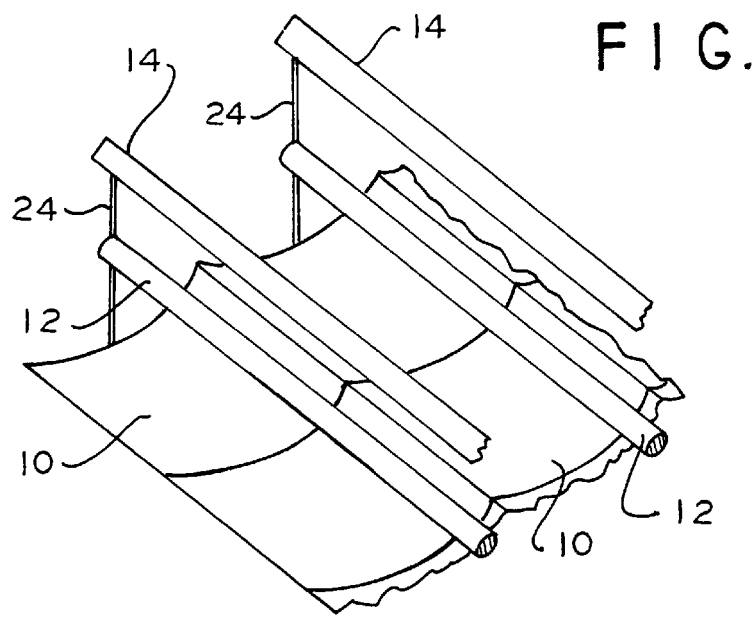
FIG. 4 is an axonometric view of a plurality of primary reflectors and a plurality of portions of the primary combining means of FIG. 1.

The primary combining means also includes a number of reflecting elements (also referred to as a redirecting means), shown herein as flat, elongated reflectors 14. Reflectors 14 are staggered and oriented to turn the beams from each stage 90 degrees, and then bundle them into thinly layered, adjacent sub-beams 15. While these sub-beams are shown stacked contiguously, in other embodiments they may be slightly separated or may overlap. As shown in FIG. 4, elements 12 and 14 may be supported on struts 24 located at opposite ends of the reflectors 10.

The bundled beam 15 thus produced is directed towards a secondary concentrating device S, shown herein to include a plurality of secondary concentrator means, namely reflectors 16. Reflectors 16 can be shaped and arranged similarly to previously mentioned reflectors 10. Since the reflectors 10 in this embodiment are relatively long, the resulting beam 15 will shine on more than one of the reflectors 16. Reflectors 16 are arranged with their axes vertical and a sufficient number may be placed side-by-side to accommodate the size of the incoming beam 15. Preferably, each of the reflectors 16 have a square outline and may in fact be identical to the segments that make up the elongated reflectors 10.

The secondary concentrating device S also includes a secondary combining means having a number of secondary collimator means 18 cooperating with reflecting elements 20. It will be appreciated that each of the reflectors 16 have associated with it a pair of elements 18 and 20. As before, the reflectors 16 each focus the concentrated electromagnetic radiation shining thereon into collimating lens 18. Lens 18 directs its collimated beam toward reflecting element 20 (also referred to as a secondary redirecting means), which may turn this secondary beam 22, 90 degrees in order to be bundled with similar secondary beams. Elements 20 may be staggered.

In FIG. 3, reflector 10 is shown mounted to be re-oriented by a drive means 26. Reflector 10 can be rotatably mounted on a gimbal or similar device. Preferably, reflector 10 can rotate about an axis parallel to the longitudinal axis of the reflector. For embodiments designed to collect solar energy, the longitudinal axis of reflector 10 should be laid in a North-South direction. Then reflector 10 can be re-oriented to track the sun as it moves to the West. Drive means 26 can include a clock mechanism to synchronize the reflectors 10. Alternatively, drive means 26 can have a light seeking device that orients the reflectors 10 toward the brightest object in the sky. For embodiments designed to collect other electromagnetic radiation (i.e., radio waves), tracker(s) may also be used, if needed, to direct the system for concentrating the specific electromagnetic radiation desired. If individual trackers are used for each reflector 10, then a second tracker may be attached to reflecting element 14. This second tracker would adjust the angle of reflectance to ensure that the secondary beam 15 would land on reflector 16 as the tracker on reflector 10 moved. This would result in the reflecting element 14, not redirecting the concentrated collimated electromagnetic radiation 90 degrees, but in fact in a constantly changing angle. Also entire completed sections P & S, for example, may be on one large single tracker. This would negate the need for the second trackers on the reflecting elements, and the redirecting angle would remain fixed.

Figure 5:
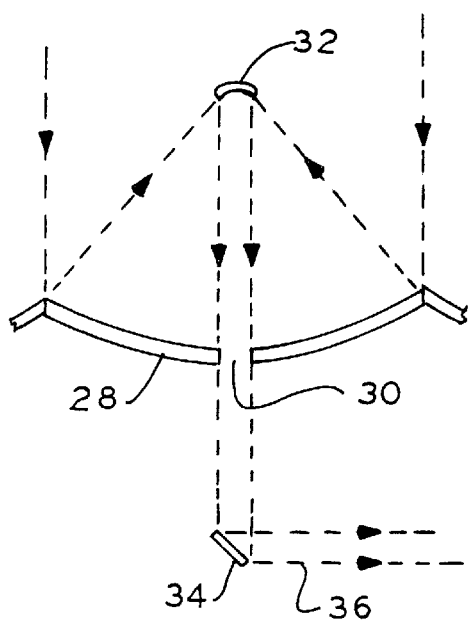
FIG. 5 is an elevational view of one portion of a primary reflector and one portion of a primary combining means that is an alternate to that illustrated in FIG. 1.

Referring to FIG. 5, an alternate concentrator is shown employing a trough-like, primary reflector 28 (also referred to as a concentrator means). Reflector 28 is similar to the previously mentioned reflector (reflector 10 of FIG. 1), except for having a longitudinal slot 30. Reflector 28 is focused onto a primary reflector 32 that also has a trough-like shape. Reflector 32 (also referred to as a collimator means) is designed to collimate electromagnetic radiation reflected from reflector 28 and transmit this collimated electromagnetic radiation through the longitudinal slot 30 in reflector 28. This collimated electromagnetic radiation then reflects off reflecting element 34 (also referred to as a redirecting means) to produce a beam 36. The elements 32 and 34 are again referred to as a combining means.

Referring to FIG. 6, previously mentioned reflectors 10 are shown composed from a plurality of square modules that may be aligned end to end to form a number of columns that occupy a square region. It will be appreciated that regions of differing proportions, shapes and arrangements can be used instead. Each of the columns formed by reflectors 10 are shown having a pair of elements, namely, previously mentioned collimating lenses 12 and reflecting elements 14. Thus, this primary concentrating means P can generate a number of sheets of electromagnetic radiation and these sub-beams are bundled and directed to the left (in this view) to secondary concentrating device S.

Secondary concentrating device S is shown employing the previously mentioned, plurality of secondary concentrating means, that is, reflectors 16. Preferably, reflectors 16 are modules that are identical to the modules forming the reflectors 10, although some embodiments will use different modules having a different construction and different proportions. The reflectors 16 are shown focusing electromagnetic radiation onto the previously mentioned collimating lenses 18 (secondary collimator means), which direct electromagnetic radiation to the secondary redirecting means 20 (the elements 18 and 20 being herein referred to as a secondary combining means).

Each of the sub-beams reflected by elements 20 are bundled together to form a secondary bundled plurality of beams that is transmitted to a tertiary concentrating device employing tertiary reflectors 40 (also referred to as a tertiary collimator means). Preferably, reflectors 40 may be modules identical to reflectors 16, although alternate reflectors can be used in other embodiments. This tertiary concentrating device also employs a tertiary combining means, namely, a collimator means 44 and a redirecting means 46. Element 44 may be similar to previously mentioned collimating lens 12 and reflecting mirror 14 (FIG. 3). Arranged in this fashion, reflecting element 46 produces a sub-beam 48 that can be bundled with like sub-beams to produce a tertiary bundled plurality of beams. These other sub-beams may be derived from systems similar to system 42.

All the components used to generate the beam transmitted to reflector 40 are generated by a system 42. In the embodiment of FIG. 6, system 42 is replicated and is arranged into a matrix. Thus one row of the systems 42 can produce sub-beams that all are combined to form tertiary beam, 50. Each of the illustrated rows of systems 42 cooperate with an associated tertiary concentrating device to produce a plurality of tertiary beams 50.

These tertiary beams 50 can be combined by a quaternary concentrating device, which is a shown herein to include quaternary reflectors 52 (quaternary concentrator means). Reflectors 52 cooperate with collimating lenses 54 and reflecting elements 56 (quaternary redirecting means), which operate as a quaternary combining means to produce a quaternary bundled plurality of beams 58. Using this building technique, the system can be expanded indefinitely, until the amount of available real estate is consumed.

Figure 7:
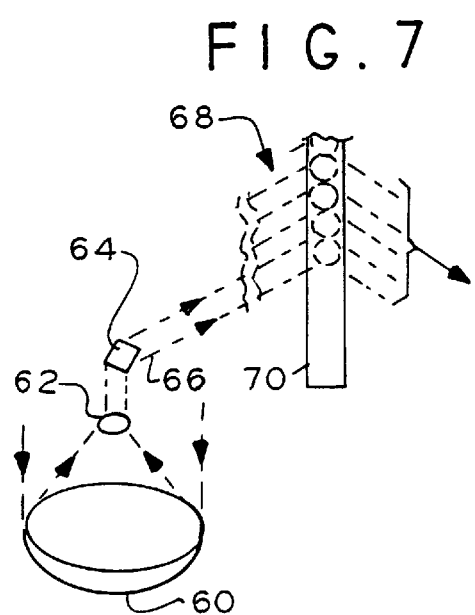
FIG. 7 is an axonometric view of a bowl-shaped primary reflector and a portion of a primary combining means that is an alternate to that illustrated in FIG. 3.

Referring to FIG. 7, an alternate primary concentrator means 60 is shown as a bowl-shaped reflector that may be manufactured using techniques similar to the techniques used for the previously discussed primary reflectors. The reflecting surface of reflector 60 may be a paraboloid designed to focus electromagnetic radiation onto a lens 62 (a collimator means) that is part of a primary combining means. This primary combining means also employs a flat reflector 64, acting as a redirecting means. Accordingly, reflector 60 can concentrate electromagnetic radiation onto collimating lens 62, which then sends a collimated beam that is reflected off reflector 64 to produce a spot beam 66. A number of other spot beams 66 can be similarly generated to produce a bundled plurality of beams 68. These spot beams 68 are reflected off another redirecting means 70, shown herein as a flat reflector.

Figure 8:
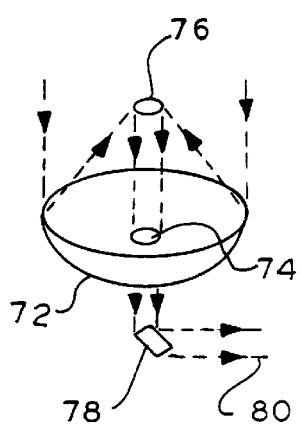
FIG. 8 is an axonometric view of a bowl-shaped primary reflector and a portion of a primary combining means that is an alternate to that illustrated in FIG. 7.

In FIG. 8, still another primary concentrating means 72 is shown as a bowl-shaped reflector, but having a central aperture 74. A bowl-shaped primary reflector 76 is located above reflector 72. Reflector 76 is designed to act as a collimator means for sending a collimated beam through central aperture 74 to a reflecting element 78 (acting as a redirecting means) in order to produce a spot beam 80, which is similar to that produced by the embodiment of FIG. 7. These spot beams can be bundled in a fashion similar to that described above in connection with FIG. 7.

Figure 9:
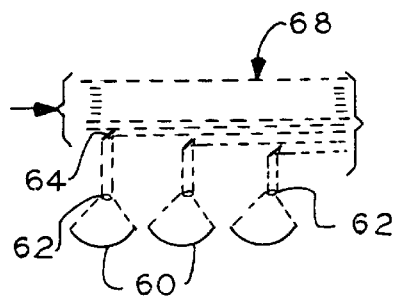
FIG. 9 is an elevational view of a plurality of the bowl-shaped primary reflectors of FIG. 7, combined with multiple portions of the primary combining means of FIG. 7.

Referring to FIG. 9, previously mentioned reflectors 60 are shown aligned in a column. Each reflector 60 in the column has associated therewith a collimator means 62 for sending a collimated beam to the redirecting means 64. With redirecting means 64 arranged in the illustrated staggered fashion, a bundled plurality 68 of adjacent spot beams are produced.

Figure 10:
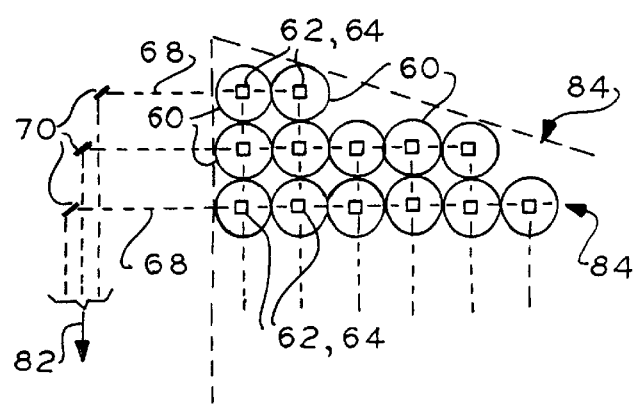
FIG. 10 is a plan view of the concentrator of FIG. 9, replicated, arranged in columns, and feeding a plurality of redirecting means.

Referring to FIG. 10, the column of reflectors 60 previously described in FIG. 9 are shown arranged as a plurality of columns 84. While three columns are illustrated herein, it will be appreciated that a larger number are contemplated. Each of the reflectors 60 has associated therewith previously mentioned elements 62 and 64. Each column 84 can therefore produce a bundled plurality 68 of spot beams. Beams 68 are directed to the reflectors 70 of another redirecting means to produce a bundle of sub-beams that are arranged in a compact grouping 82.

Figure 11:
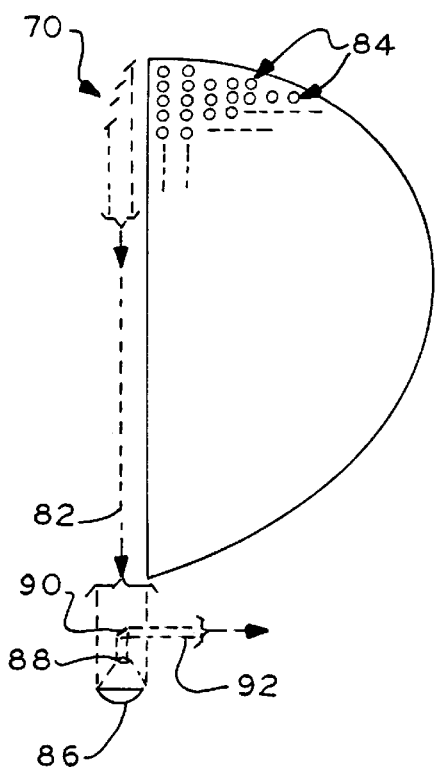
FIG. 11 is one possible arrangement of a reduced scale, overall plan view of the concentrator of FIG. 10 showing the plurality of redirecting means feeding a portion of a secondary concentrating means.

Referring to FIG. 11, the previously mentioned columns 84 of FIG. 10 are shown arranged in columns that have differing sizes. Columns in the center will be the longest while columns at opposite ends will be the shortest. The resulting compact grouping 82 of sub-beams will be shaped by the differing column sizes. By properly sizing and orienting the redirecting means 70, the compact grouping 82 can have an approximately circular outline when finally arriving at a secondary reflector 86. It will be appreciated that orientations other than a semi-circle are possible. Preferably, each of the sub-beams in grouping 82 will be contiguous spot beams consequently reflector 86 can be another bowl-shaped reflector that can focus electromagnetic radiation into a collimating lens 88 so that electromagnetic radiation can be sent by a reflecting element 90 as a sub-beam 92. Sub-beam 92 can be bundled with other sub-beams to produce a more energetic beam.

To facilitate an understanding of the principles associated with the foregoing apparatus, its operation will be briefly described in connection with the embodiment of FIG. 6, although operation with respect to the other embodiments will be similar. If solar concentration is desired, the reflectors 10 are arranged in the illustrated pattern, extending over a horizontal surface and facing the sun. Embodiments having the drive means 26 of FIG. 3, will operate to slew the reflectors 10 to point at the sun. The drive means 26 will continue to gradually move the reflectors 10 as the sun travels across the sky.

With the reflectors 10 properly oriented, sunlight will be gathered as illustrated in FIG. 3 and focused onto the collimating lens 12. Lens 12 produces a sheet of light that is reflected off reflecting element 14 to produce the sub-beam 15 that is combined with other sub-beams to produce the primary beam.

As shown in FIG. 1, a number of reflectors 10 each focus the electromagnetic radiation gathered by them onto a corresponding collimating lens 12. Each lens is shown casting its collimated electromagnetic radiation onto an associated reflecting element 14 to stack the sub-beams into a thinly layered bundle of beams that are then directed to a number of secondary reflectors 16. FIGS. 2 and 6 show secondary reflectors 16 intercepting the concentrated electromagnetic radiation gathered by reflectors 10. Each of the secondary reflectors 16 operates with an associated collimating lens 18 to produce a collimated sub-beam that is reflected off a reflecting element 20 to be bundled with similar sub-beams that are directed toward tertiary reflector 40.

Each of those several systems 42 are arranged in rows that each produce a sub-beam that is bundled into a beam 50 that is directed to quaternary reflector 52. Two rows of systems 42 are shown producing individual beams 50 that are directed to associated quaternary reflectors 52, although it will be appreciated that a larger number or rows is suggested by this illustration. Again, each reflector 52 has a collimating element 54 and a reflecting element 56 to direct each sub-beam into a bundle 58.

As an example, water in a steam generating plant can be boiled by the final beam to create steam that drives a turbine to produce electricity. Alternatively, the resulting beam can be used in a fabrication process to bore holes or to cut a material. Still other uses are contemplated, as mentioned above.

It is appreciated that various modifications may be implemented with respect to the above described embodiment. The number of rows and the number of concentrator means per row can be varied depending upon the desired intensity, capacity, etc. The illustrated concentrator means as seen in FIGS. 6 and 11 can be distributed in various patterns that result in shapes other than rectangular and semicircular patterns. Also, the illustrations of individual concentrator means show only two types: square troughs and round bowl-shaped reflectors. However, they can also be parabolic, cylindrical or spherical reflectors, lenses, or any other electromagnetic radiation concentrator means; and of various shapes other than square or round. In addition, the materials used for the various components can be altered depending upon the desired strength, accuracy, thermal stability, specific type of electromagnetic radiation concentration desired, etc.

Other lens and reflector shapes (convex, concave, off-axis, etc.) in other combinations can be used to collimate and redirect electromagnetic radiation reflecting off a concentrator. Stacking or bundling of the electromagnetic radiation beams can be accomplished by staggering the redirecting reflectors as shown in FIGS. 1 and 9, or by staggering other things like the concentrator-collimator-redirector combo units themselves (i.e., as if they were sitting on bleachers).

Obviously, many modifications and variations of the present invention are possible in light of the above teachings. It is therefore to be understood that within the scope of the appended claims, the invention may be practiced otherwise than as specifically described.

What is claimed is:

1. An array of concentrators of electromagnetic radiation employing one or more concentrating devices, comprising:

a plurality of concentrator means, each operable to individually produce converging electromagnetic radiation by concentrating the incident electromagnetic radiation impinging thereon;

a plurality of collimator means each operable to individually convert converging electromagnetic radiation from said concentrator means into collimated electromagnetic radiation; and a plurality of redirecting means disposed to receive collimated electromagnetic radiation from said collimator means for producing a stacked or bundled plurality of substantially parallel beams more closely spaced than said plurality of concentrator means.

2. An array of electromagnetic radiation concentrators according to claim 1 wherein at least portions of each of said concentrating devices are staggered to produce said stacked or bundled plurality of beams from the concentrators.

3. An array of electromagnetic radiation concentrators according to claim 2 comprising one or more secondary concentrating devices for strengthening the stacked or bundled plurality of beams, said secondary concentrating device comprising:
- one or more secondary concentrator means disposed to receive said stacked or bundled plurality of beams;
- one or more secondary collimator means disposed to receive electromagnetic radiation from said secondary concentrator means; and
- one or more secondary redirecting means disposed to receive electromagnetic radiation from said secondary collimator means.

4. An array of electromagnetic radiation concentrators according to claim 3 wherein portions of said secondary concentrating devices are staggered to produce a secondary bundled plurality of beams from the array of concentrating devices.

5. An array of electromagnetic radiation concentrators according to claim 4 comprising one or more tertiary concentrating devices for further strengthening said secondary bundled plurality of beams, said tertiary concentrating devices comprising:
- one or more tertiary concentrator means disposed to receive said secondary bundled plurality of beams;
- one or more tertiary collimator means disposed to receive electromagnetic radiation from said tertiary concentrator means; and
- one or more tertiary redirecting means disposed to receive electromagnetic radiation from said tertiary collimator means.

6. An array of electromagnetic radiation concentrators according to claim 5 wherein portions of said tertiary concentrating devices are staggered to produce a tertiary bundled plurality of beams.

7. An array of electromagnetic radiation concentrators according to claim 4 comprising a cascaded plurality of ordered concentrating devices for further strengthening said secondary bundled plurality of beams, electromagnetic radiation being passed successively through each of said ordered concentrating devices from a first one to a last one, each of said ordered concentrating devices comprising:
- a succeeding concentrator means disposed to receive electromagnetic radiation at least partially derived from said secondary bundled plurality of beams;
- a succeeding collimator means disposed to receive electromagnetic radiation from said succeeding concentrator means; and
- a succeeding redirecting means disposed to receive electromagnetic radiation from said succeeding collimator means.

* * * * *

UNITED STATES PATENT AND TRADEMARK OFFICE
CERTIFICATE OF CORRECTION

PATENT NO : 6,164,786
DATED : December 26, 2000
INVENTOR(S): Beverly Lloyd

It is certified that error appears in the above-identified patent and that said Letters Patent is hereby corrected as shown below:

Title page,
Change Title to:

ELECTROMAGNETIC RADIATION CONCENTRATOR SYSTEM

Signed and Sealed this

First Day of May, 2001

Attest:

NICHOLAS P. GODICI

Attesting Officer

Acting Director of the United States Patent and Trademark Office